(12) United States Patent
Roh et al.

(10) Patent No.: US 9,401,513 B2
(45) Date of Patent: Jul. 26, 2016

(54) TITANIUM SUBOXIDE SUPPORTS FOR CATALYST ELECTRODE OF FUEL CELL AND LOW TEMPERATURE SYNTHESIS OF TITANIUM SUBOXIDE

(71) Applicants: Hyundai Motor Company, Seoul (KR); Soongsil University Research Consortium techno-PARK, Seoul (KR)

(72) Inventors: Bum Wook Roh, Seongnam-si (KR); Jin Seong Choi, Anyang-si (KR); Mi Hye Yi, Yongin-si (KR); In Chul Hwang, Incheon (KR); Young Woo Lee, Seoul (KR); Sang Beom Han, Incheon (KR); Kyung Won Park, Seoul (KR)

(73) Assignees: HYUNDAI MOTOR COMPANY, Seoul (KR); SONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 212 days.

(21) Appl. No.: 14/061,699

(22) Filed: Oct. 23, 2013

(65) Prior Publication Data
US 2014/0308603 A1    Oct. 16, 2014

(30) Foreign Application Priority Data

Apr. 11, 2013    (KR) .................. 10-2013-0039835

(51) Int. Cl.
*H01M 4/90*    (2006.01)
*H01M 4/92*    (2006.01)

(52) U.S. Cl.
CPC ............ *H01M 4/9075* (2013.01); *H01M 4/925* (2013.01); *Y02E 60/50* (2013.01)

(58) Field of Classification Search
CPC ..... H01M 4/9075; H01M 4/925; Y02E 60/50
See application file for complete search history.

(56) References Cited

U.S. PATENT DOCUMENTS

2005/0271928 A1    12/2005    Ovshinsky et al.

FOREIGN PATENT DOCUMENTS

| KR | 2007-0055119 A | 5/2007 |
|---|---|---|
| KR | 2011-0051955 A | 5/2011 |

(Continued)

OTHER PUBLICATIONS

Lee, Y-W, et. al. "Facile and Catalytic Synthesis of Conductive Titanium Suboxides for Enhanced Oxygen Reduction Activity and Stability in Proton Exchange Membrane Fuel Cells", Int. J. Electrochem. Sci., vol. 8, pp. 9499-9507, published Jul. 1, 2013.*

(Continued)

*Primary Examiner* — Carlos Barcena
*Assistant Examiner* — Lilia V Nedialkova
(74) *Attorney, Agent, or Firm* — McDermott Will & Emery LLP

(57) ABSTRACT

Titanium suboxide ($Ti_xO_{2x-1}$) nanoparticles useful as a support for a catalyst electrode of a fuel cell, and a method for synthesizing the titanium suboxide ($Ti_xO_{2x-1}$) nanoparticles by using $TiO_2$, a Co catalyst and hydrogen gas at a low temperature ranging from 600 to 900° C. are described Since the titanium suboxide nanoparticles show high corrosion resistance to acid and durability and have excellent thermal and electric conductivities, a catalyst electrode manufactured by using the same as a support exhibits improved catalytic activity and oxidation reduction (redox) properties.

5 Claims, 5 Drawing Sheets

(56) References Cited

FOREIGN PATENT DOCUMENTS

| | | |
|---|---|---|
| KR | 10-2013-0091219 A | 8/2013 |
| WO | 02/090024 A1 | 11/2002 |
| WO | 2009/024776 A1 | 2/2009 |

OTHER PUBLICATIONS

Ioroi, et al., "Sub-stoichiometric titanium oxide-supported platinum electrocatalyst for polymer electrolyte fuel cells," Electrochemistry Communications, vol. 7 (2005), pp. 183-188, Elsevier.

* cited by examiner

TITANIUM SUBOXIDE SUPPORTS FOR CATALYST ELECTRODE OF FUEL CELL AND LOW TEMPERATURE SYNTHESIS OF TITANIUM SUBOXIDE

CROSS-REFERENCE TO RELATED APPLICATION

This application claims under 35 U.S.C. §119 (a) priority to and the benefit of Korean Patent Application No. 10-2013-0039835 filed Apr. 11, 2013, the entire contents of which are incorporated herein by reference.

TECHNICAL FIELD

The present disclosure relates to a titanium suboxide support for a catalyst electrode of a fuel cell and a low temperature synthetic method thereof. More particularly, the present disclosure relates to titanium suboxide ($Ti_xO_{2x-1}$) nanoparticles used as a support for a catalyst electrode of a fuel cell, and a method for synthesizing the titanium suboxide ($Ti_xO_{2x-1}$) nanoparticles by using $TiO_2$, a Co catalyst and hydrogen gas at a low temperature ranging from 600° C. to 900° C.

BACKGROUND

A fuel cell has a general structure composed of an anode, a cathode, and a polymer electrolyte membrane. The anode includes a catalyst layer for promoting fuel oxidation, and the cathode includes a catalyst layer for promoting reduction of an oxidizing agent. At the anode, hydrogen ions and electrons are generated due to fuel oxidation. The hydrogen ions are delivered to the cathode through the electrolyte membrane, and the electrons are delivered to an external circuit through a conducting wire. At the cathode, the hydrogen ions delivered through the electrolyte membrane, electrons delivered from the external circuit through the conducting wire and oxygen are combined, thereby generating water. At this time, electron transfer from the anode to the cathode via the external circuit is electric power. The cathode and anode of the fuel cell include catalysts for promoting electrochemical oxidation of fuel and electrochemical reduction of oxygen, respectively.

Performance of a fuel cell is considerably influenced by catalyst performance of a cathode and anode. As a catalyst material suitable for an electrode, noble metals such as platinum have been widely used. Especially, a Pt/C catalyst in which platinum particles are impregnated on a carbon support having a high specific surface area and a good electrical conductivity has been representatively used. However, because platinum is very expensive, there is a need to maximize catalyst performance by reducing the amount of platinum used in the particle impregnation and optimizing impregnation-related factors so as to achieve successful impregnation with only a relatively small amount of platinum.

For this, an electrode catalyst in which alloy particles of platinum (Pt) has been recently developed, and other transition metals such as nickel (Ni), paladium (Pd), rhodium (Rh), titanium (Ti), zirconium (Zr) and the like are impregnated on a carbon-based support. However, the carbon-based support has problems in that it is unstable under electrochemical conditions of an electrode and easily oxidized, leading to a falling-off in long term stability. In order to solve these problems, there have been several studies to employ a transition metal oxide being stable under an acidic condition as a support, but the transition metal oxide exhibits relatively low electrical conductivity, and thus, it is difficult to sufficiently ensure the performance of a fuel cell.

Meanwhile, titanium suboxide (TSO) has been developed as a transition metal oxide. According to a conventional method, titanium suboxide is prepared as a micron-scale particle through a high temperature reaction at 1200° C., which makes it difficult to use titanium suboxide as a catalyst support.

The present disclosure endeavors to overcome the prior art problems as set forth above by describing a method for synthesizing nano-scale titanium suboxide at a temperature ranging from 600° C. to 900° C. by applying $Co^{2+}$ ions as a catalyst for decreasing a temperature required for heat treatment of nano-scale titanium dioxide under reducing atmosphere (under hydrogen, nitrogen or methane gas). The titanium suboxide nanoparticle according to the method of the present disclosure has a high conductivity enough to improve long term stability of a catalyst electrode for a fuel cell. When a metal catalyst is manufactured by using the titanium suboxide nanoparticle as a support, the metal catalyst can significantly enhance efficiency and durability of a fuel cell.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with prior art.

An aspect of the present disclosure provides a catalyst electrode of a fuel cell in which an active metal is impregnated on a support, wherein the support is a titanium suboxide ($Ti_xO_{2x-1}$, wherein x is an integer from 2 to 9) nanoparticle.

In an exemplary embodiment, the active metal is platinum (Pt) or an alloy of platinum (Pt) and more than one transition metals selected from nickel (Ni), palladium (Pd), rhodium (Rh), titanium (Ti) and zirconium (Zr).

A method for synthesizing titanium suboxide includes: absorbing $Co^{2+}$ ions to nano-scale titanium dioxide under the presence of ethanol as a solvent; evaporating the ethanol solvent therefrom, to thereby obtain powder; and reacting the powder at a temperature ranging from 600° C. to 900° C. in an electric furnace under a reducing atmosphere, to thereby obtain titanium suboxide ($Ti_xO_{2x-1}$, wherein x is an integer from 2 to 9) nanoparticles.

In an exemplary embodiment, the titanium suboxide nanoparticle is synthesized under a reducing atmosphere of hydrogen, nitrogen or methane gas.

In another exemplary embodiment, the titanium suboxide nanoparticle is synthesized at a temperature ranging from 600° C. to 900° C. under a reducing atmosphere of hydrogen gas for 2 to 4 hr.

In still another aspect, the present disclosure provides a catalyst electrode of a fuel cell which is characterized by employing the titanium suboxide nanoparticle synthesized according to the above method as a support.

In a further aspect, a method for manufacturing a catalyst electrode of a fuel cell includes: absorbing $Co^{2+}$ catalytic ions to nano-scale titanium dioxide under the presence of ethanol as a solvent; evaporating ethanol therefrom, to thereby obtain powder; placing the powder obtained above in an electric furnace and reacting it at a temperature ranging from 600° C. to 900° C. under a reducing atmosphere, to thereby obtain titanium suboxide ($Ti_xO_{2x-1}$, wherein x is an integer from 2 to 9) nanoparticles; and impregnating an active metal on the thus obtained titanium suboxide nanoparticles, to thereby obtain a catalyst electrode.

In an exemplary embodiment, the active metal is platinum (Pt) or an alloy of platinum (Pt) and more than one of transition metals selected from nickel (Ni), paladium (Pd), rhodium (Rh), titanium (Ti) and zirconium (Zr).

Other aspects and preferred embodiments of the disclosure are discussed hereinafter.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
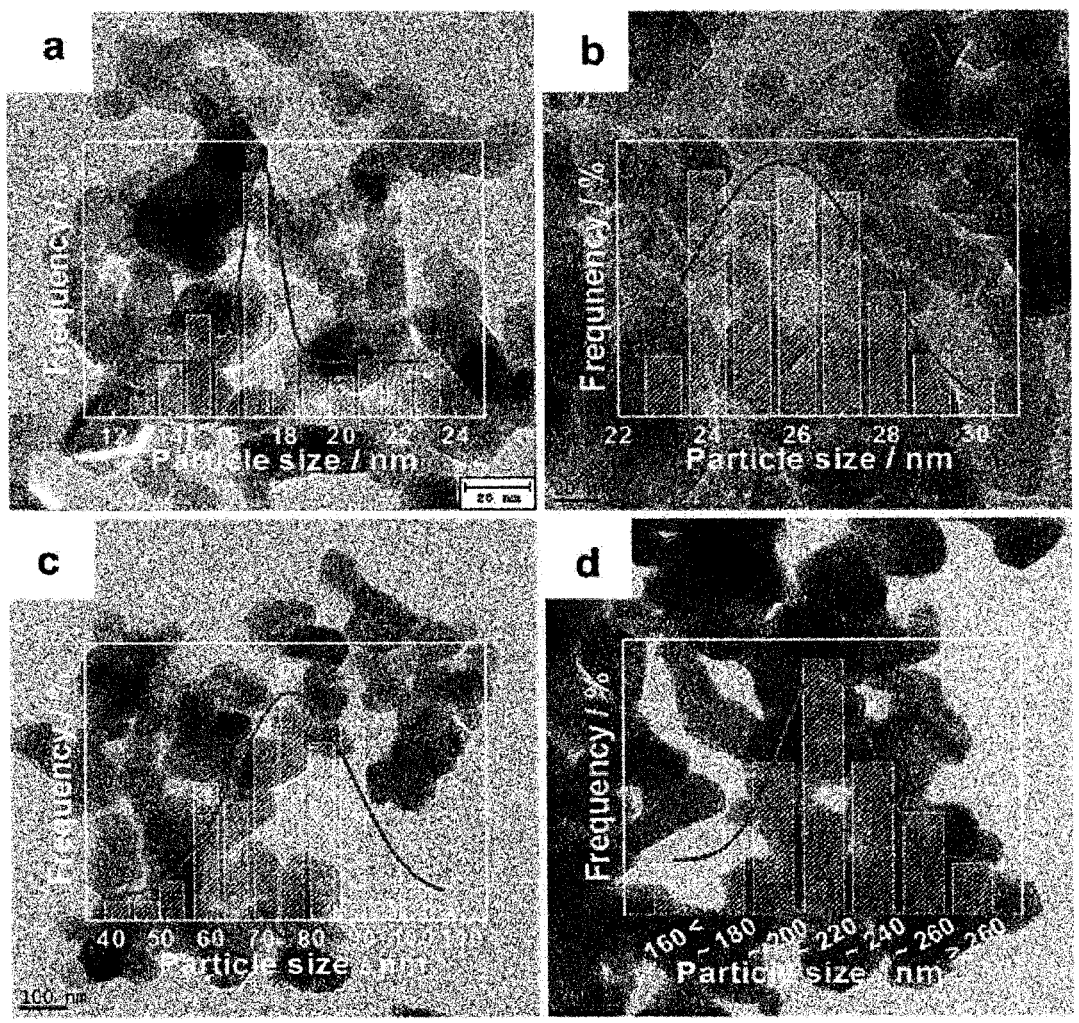
FIGS. 1a to 1d represent TEM images of $TiO_2$, a $TiO_2$-400CH support, a $TiO_2$-700CH support and a $TiO_2$-800CH support synthesized according to the present disclosure and particle size distribution graphs thereof, respectively.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the described embodiment throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present disclosure provides a catalyst electrode of a fuel cell in which an active metal is impregnated on a support, wherein the support is titanium suboxide ($Ti_xO_{2x-1}$, wherein x is an integer from 2 to 9) nanoparticles.

The active metal is platinum (Pt) or an alloy of platinum (Pt) and more than one of transition metals selected from nickel (Ni), paladium (Pd), rhodium (Rh), titanium (Ti) and zirconium (Zr).

A method for synthesizing titanium suboxide includes: absorbing $Co^{2+}$ ions to nano-scale titanium dioxide under the presence of ethanol as a solvent; evaporating ethanol therefrom, to thereby obtain powder; and reacting the powder at a temperature ranging from 600° C. to 900° C. in an electric furnace under a reducing atmosphere, to thereby obtain titanium suboxide ($Ti_xO_{2x-1}$, wherein x is an integer from 2 to 9) nanoparticles.

In an exemplary embodiment of the present disclosure, the synthetic method of titanium suboxide is characterized in that the reducing atmosphere is produced by using a stream of hydrogen, nitrogen or methane gas.

A method for manufacturing a catalyst electrode of a fuel cell includes: absorbing $Co^{2+}$ catalytic ions to nano-scale titanium dioxide under the presence of ethanol as a solvent; evaporating ethanol therefrom, to thereby obtain powder; placing the powder obtained above in an electric furnace and reacting it at a temperature ranging from 600° C. to 900° C. under a reducing atmosphere, to thereby obtain titanium suboxide ($Ti_xO_{2x-1}$, wherein x is an integer from 2 to 9) nanoparticles; and impregnating an active material on the thus obtained titanium suboxide nanoparticles, to thereby obtain a catalyst electrode.

The manufacturing method of a catalyst electrode of a fuel cell is characterized in that the active metal is platinum (Pt) or an alloy of platinum (Pt) and more than one of transition metals selected from nickel (Ni), paladium (Pd), rhodium (Rh), titanium (Ti) and zirconium (Zr).

According to the low temperature synthetic method of the present disclosure, titanium suboxide (TSO) can be synthesized by heating titanium dioxide on which cobalt ions are impregnated under hydrogen atmosphere. The synthesized titanium suboxide has advantages of high corrosion resistance to an acid, strong durability and excellent thermal and electric conductivities. Thus, a catalyst electrode manufactured by using the titanium suboxide as a support can exhibit improved catalytic activity and oxidation reduction (redox) properties due to high interaction with an active metal.

EXAMPLES

The following examples illustrate the invention and are not intended to limit the same.

The present disclosure provides a catalyst electrode of a fuel cell which is composed of an active metal and a titanium suboxide support being prepared according to a low temperature synthetic method through a catalytic reaction and a manufacturing method of a catalyst electrode.

Example 1

Preparation of Titanium Suboxide

To a round-bottom flask, 100 mL of ethanol, 1 g of $TiO_2$ having a particle size of 20 nm to 30 nm (P25, Degussa, Co.) and 0.2 g of $CoCl_2.6H_2O$ (Sigma Aldrich) were added, followed by stirring. Here, ethanol acts as a solvent to assist the absorption between $TiO_2$ and $Co^{2+}$.

In order to completely dissolve $CoCl_2.6H_2O$ and allow the absorption of $Co^{2+}$ ions to the surface of $TiO_2$, the resulting mixture was stirred at room temperature for 30 min and subjected to sonication. The mixture was then kept in an evaporator at 60° C. until ethanol was completely evaporated.

Then, 0.1 g of the thus obtained $Co^{2+}/TiO_2$-prep.nanoparticles were successively heated to 400° C., 700° C., and 800° C. each for 3 hr under hydrogen atmosphere ($TiO_2$-400CH, $TiO_2$-700CH, $TiO_2$-800CH (TSO), rising temperature: 8.61° C./min). The nanoparticles were then subjected to X-ray diffraction, high magnification microscope and conductivity analyses.

Further, in order to investigate the formation of titanium suboxide, 0.1 g of the thus obtained $Co^{2+}/TiO_2$-prep.nanoparticles were heated to 800° C. for 3 hr under nitrogen atmosphere ($TiO_2$-800CN, rising temperature: 8.61° C./min).

Example 2

Manufacture of a Metal Catalyst for a Fuel Cell

In order to manufacture a $Pt/TiO_2$-800CH (Pt/TSO) metal catalyst in which 20 wt % of platinum (Pt) is impregnated on the titanium suboxide ($TiO_2$-800CH) support synthesized in Example 1, 780 mg of $TiO_2$-800CH was dispersed in 500 mL of distilled water, followed by dissolving 40.9 mg of $H_2PtCl_6 \cdot H_2O$ therein.

For removing impurities, the thus prepared Pt/TSO was filtered and washed with ethanol three times and with distilled water once, thereby manufacture a nano-scale controlled Pt/TSO catalyst. The resulting catalyst was then subjected to X-ray diffraction, high magnification microscope and conductivity analyses.

Experimental Example 1

Transmission Electron Microscope (TEM) Observation

In order to examine whether the titanium suboxides $TiO_2$-400CH, $TiO_2$-700CH and $TiO_2$-800CH synthesized in Example 1 have a nano-scale controlled structure suitable for use as a support for a metal catalyst of a fuel cell, they were observed with a transmission electron microscope (TEM), and the results are shown in FIGS. 1a to 1d.

As shown in FIGS. 1a to 1d, it was found that the more the reaction temperature was increased, the larger the particle size of $TiO_2$ (a), $TiO_2$-400CH (b), $TiO_2$-700CH (c), and $TiO_2$-800CH (d) nanoparticles was increased. The average particle size of each titanium suboxide was measured, and the results are shown in Table 1 below.

TABLE 1

| Support | Average particle size (nm) |
|---|---|
| $TiO_2$ | 17.22 ± 0.6 |
| $TiO_2$—400CH | 25.7 ± 2.1 |
| $TiO_2$—700CH | 76 ± 12 |
| $TiO_2$—800CH | 221 ± 71 |

Experimental Example 2

X-Ray Diffraction Analysis

Figure 2:
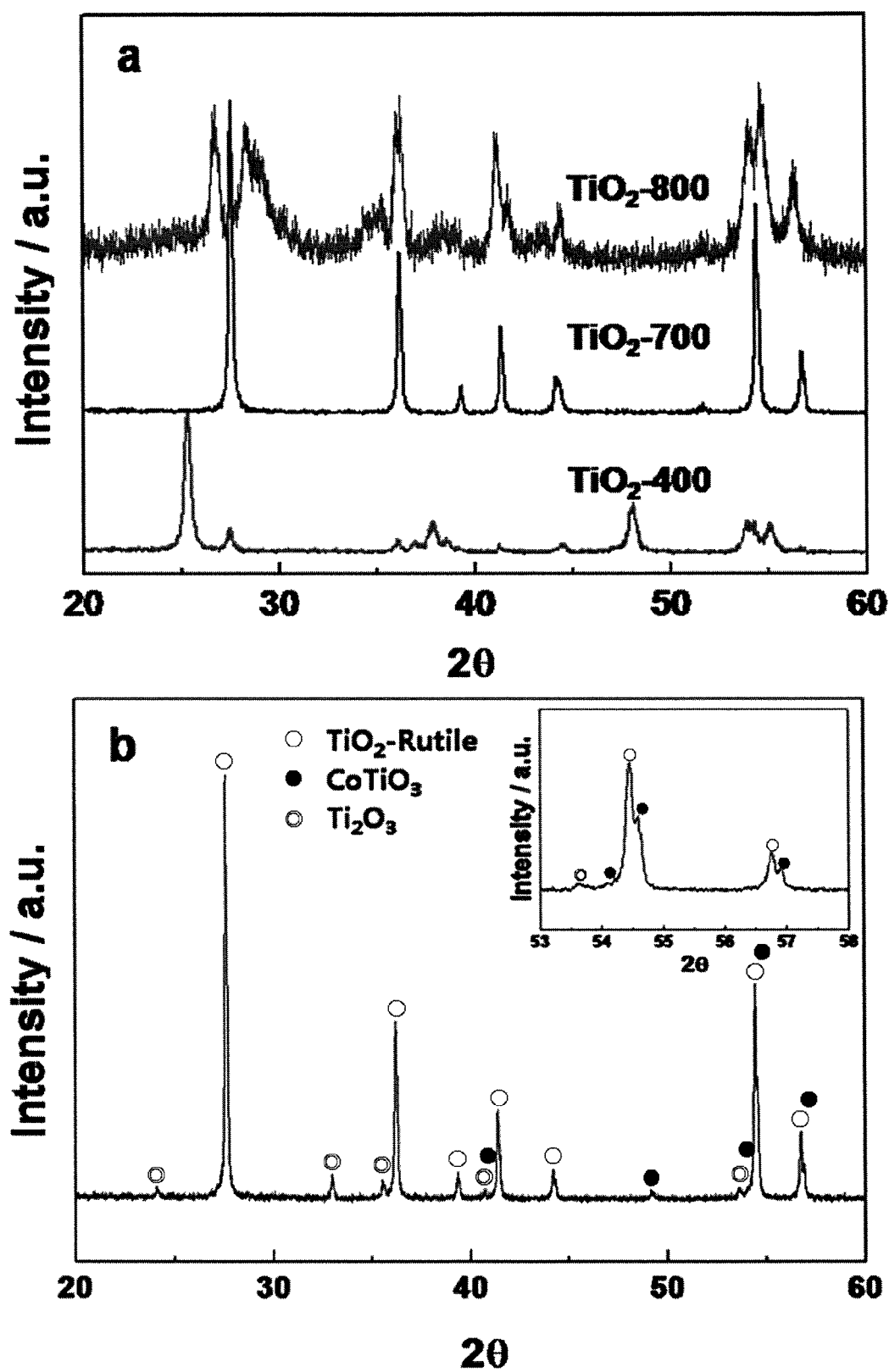
FIGS. 2a and 2b represent XRD graphs of $TiO_2$, a $TiO_2$-400CH support, a $TiO_2$-700CH support and a $TiO_2$-800CH support synthesized according to the present disclosure, and a XRD graph of a $TiO_2$-800CN support, respectively.

In order to investigate the structures of titanium suboxide $TiO_2$-400CH, $TiO_2$-700CH, and $TiO_2$-800CH synthesized in Example 1, X-ray diffraction (XRD) analysis was carried out at a theta (θ) value ranging from 20° to 60°, and the results are shown in FIG. 2a.

Referring to FIG. 2a, it was confirmed that as a result of investigating the structures of nano-scale controlled titanium suboxides $TiO_2$, $TiO_2$-400CH, $TiO_2$-700CH, and $TiO_2$-800CH, $TiO_2$-400CH had a hybrid structure of anatase and rutile, $TiO_2$-700CH had only a rutile structure, and $TiO_2$-800CH had a titanium suboxide structure. Further, such a titanium suboxide structure of $TiO_2$-800CH was found to be identical to the structure of $Ti_8O_{15}$, which complies with JCPDS No. 85-1060.

Referring to FIG. 2b, it was found that $CoTiO_3$ was formed as a result of examining $TiO_2$-800CN in order to observe the formation process of titanium suboxide, which confirms that $Co^{2+}$ ions are oxidized by oxygen derived from $TiO_2$. The result suggests that such an oxidation reaction contributes to the formation of a titanium suboxide structure at a low temperature.

Experimental Example 3

Measurement of Electrical Conductivity

Figure 3:
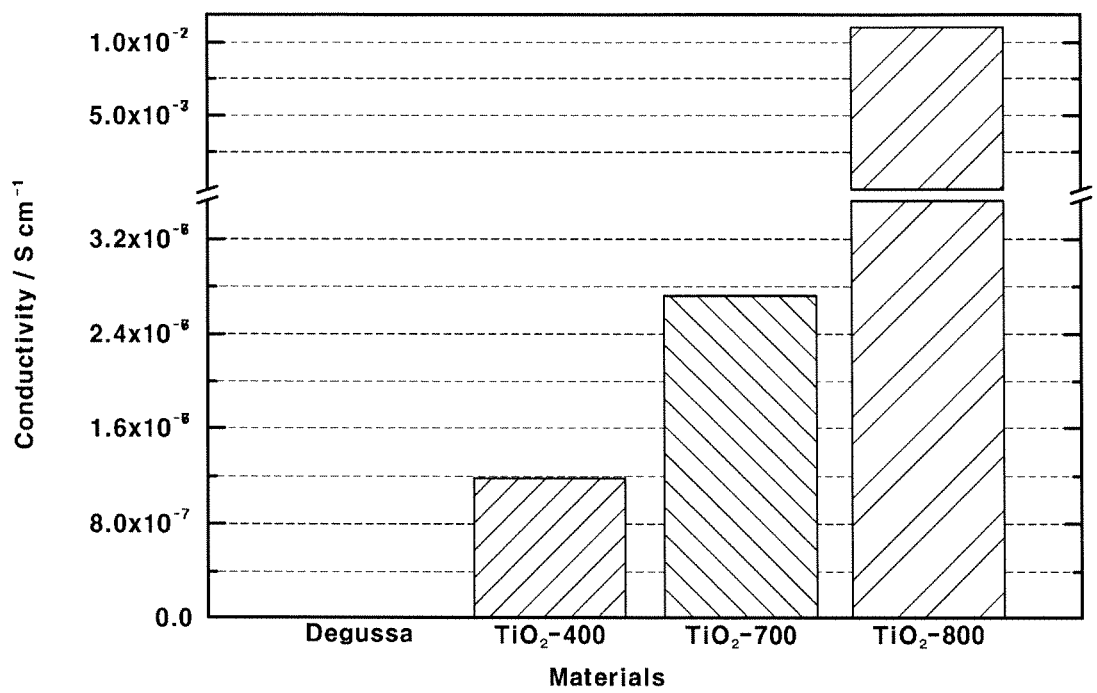
FIG. 3 represents an electrical conductivity graph of $TiO_2$, a $TiO_2$-400CH support, a $TiO_2$-700CH support and a $TiO_2$-800CH support synthesized according to the present disclosure.

Electrical conductivities of the titanium suboxides $TiO_2$-400CH, $TiO_2$-700CH, and $TiO_2$-800CH synthesized in Example 1 were measured, and the results are shown in FIG. 3 and Table 2.

TABLE 2

| Support | Electrical conductivity ($Scm^{-1}$) |
|---|---|
| $TiO_2$ | $2.89 \times 10^{-8}$ |
| $TiO_2$—400CH | $1.18 \times 10^{-6}$ |
| $TiO_2$—700CH | $2.76 \times 10^{-6}$ |
| $TiO_2$—800CH | $1.10 \times 10^{-2}$ |

Experimental Example 4

Figure 4:
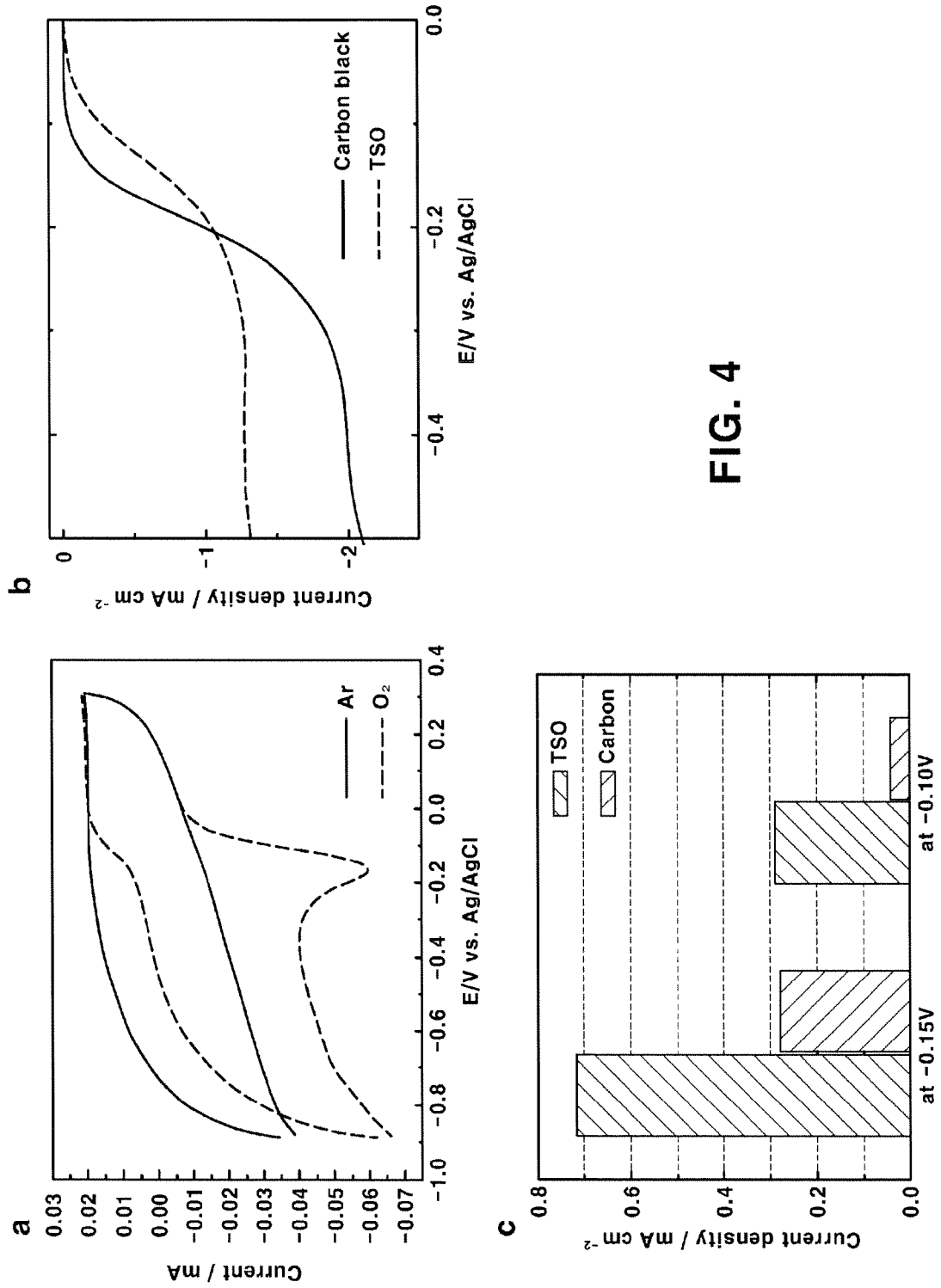
FIGS. 4a to 4c represent graphs comparing oxidation reduction (redox) current and oxygen reduction current of a TSO support synthesized according to the present disclosure with those of carbon black as a conventional support.

Measurement of Current Density to Voltage in Response to an Oxygen Reduction Reaction of a Support Current densities to voltage for the titanium suboxide support synthesized in Example 1 and a conventional carbon black support were measured. For this, the change in redox current density was measured by using a 0.1 M sodium hydroxide aqueous solution saturated with argon according to a conventional electrochemical method (triple pole cell). Referring to FIG. 4a, the electrode prepared above was used as a working electrode, and a platinum line and Ag/AgCl were used as a counter electrode and a reference electrode, respectively. Catalytic activities of these electrodes were measured in the 0.1 M sodium hydroxide aqueous solution saturated with argon.

In order to compare the catalytic activity of the titanium suboxide support synthesized in Example 1 with that of the carbon black support, the change in oxygen reduction current density to voltage was measured by using a 0.1 M sodium hydroxide aqueous solution saturated with oxygen according to a conventional electrochemical method. For investigating electrochemical properties in response to the oxygen reduction reaction, the measurement was carried out in the 0.1 M sodium hydroxide aqueous solution saturated with oxygen at 1600 rpm, and the results are shown in FIGS. 4b and 4c.

Referring to FIG. 4c, as a result of comparing catalytic activities in response to the oxygen reduction reaction, the titanium suboxide support according to the present disclosure exhibited enhanced catalytic activity as compared to the carbon black support and showed higher redox current density each at −0.15V and −0.10V than the carbon black. These results suggest that the titanium suboxide according to the present disclosure is an electrode material having dual function as a support and a catalyst.

Experimental Example 5

Measurement of Current Density to Voltage in Response to an Oxygen Reduction Reaction of a Pt/TSO Electrode The change in redox current density to voltage of a Pt/TSO catalyst using the titanium suboxide according to the present disclosure as a support was measured by using a 0.1 M perchloric acid aqueous solution saturated with argon according to a conventional electrochemical method (triple pole cell). For comparison, the change in redox current density to voltage of a conventional Pt/C catalyst was measured using the same method. Here, the electrode prepared above was used as a working electrode, and a platinum line and Ag/AgCl were used as a counter electrode and a reference electrode, respectively. Catalytic activities of these electrodes were measured in the 0.1 M perchloric acid aqueous solution saturated with argon, and the results are shown in FIG. 5a.

In order to compare the catalytic activity of the Pt/TSO catalyst prepared above with that of the conventional Pt/C catalyst, the change in oxygen reduction current density to voltage was measured by using a 0.1 M perchloric acid aqueous solution saturated with oxygen according to a conventional electrochemical method (triple pole cell). For investigating electrochemical properties in response to the oxygen reduction reaction, the measurement was carried out in the 0.1 M perchloric acid aqueous solution saturated with oxygen at 1600 rpm, and the results are shown in FIGS. 5b to 5d.

Figure 5:
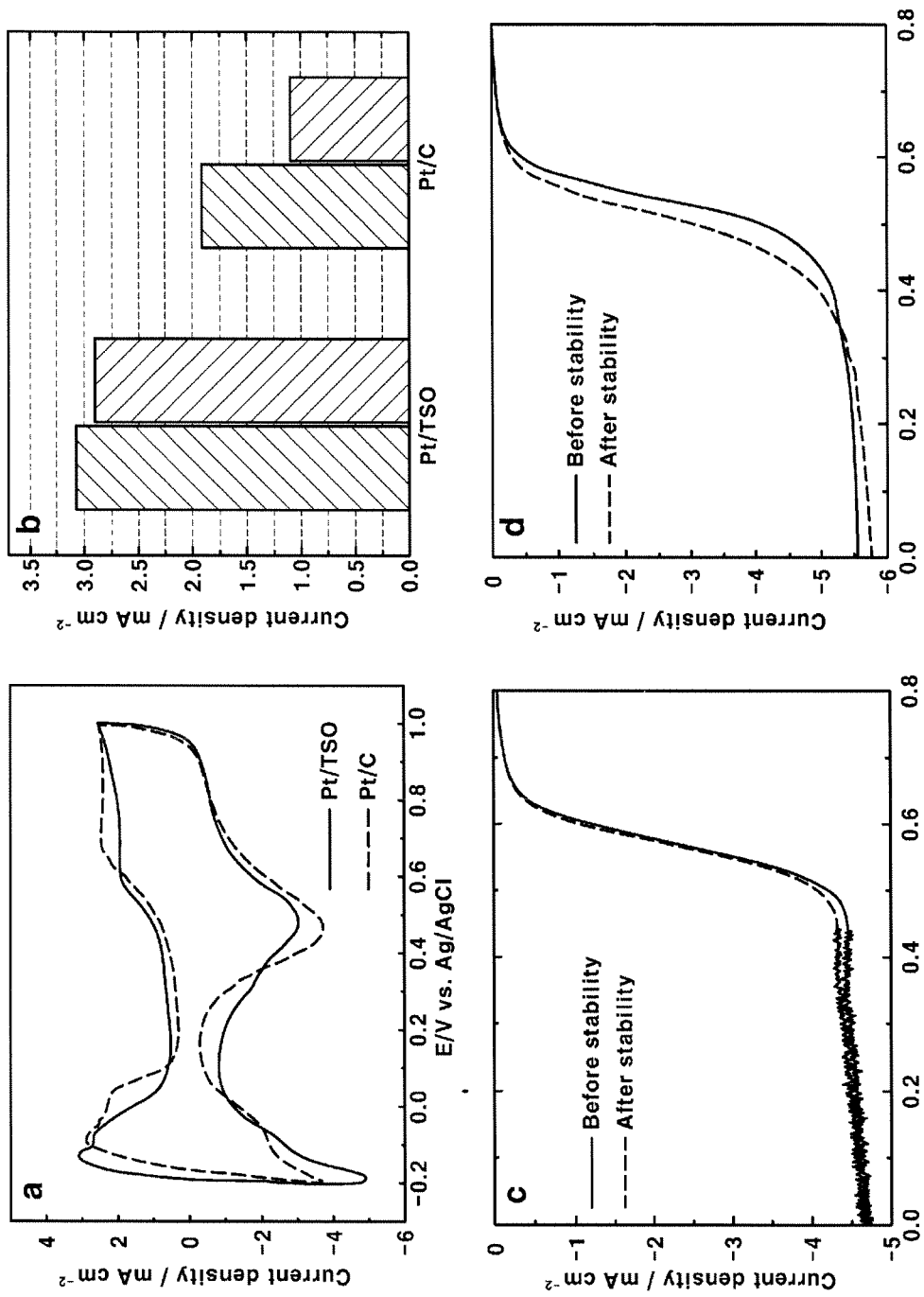
FIGS. 5a to 5d represent graphs comparing oxidation reduction (redox) current and oxygen reduction current of a Pt/TSO catalyst manufactured according to the present disclosure with those of a conventional Pt/C catalyst.

Referring to FIG. 5b, as a result of comparing catalytic activities in response to the oxygen reduction reaction, the Pt/TSO catalyst according to the present disclosure exhibited enhanced catalytic activity as compared to the Pt/C catalyst, and showed higher redox current density at −0.55V than the Pt/C catalyst.

Experimental Example 6

Measurement of Stability in Response to an Oxygen Reduction Reaction

After the Pt/TSO catalyst and conventional Pt/C catalyst were kept in a 0.1 M perchloric acid aqueous solution saturated with oxygen at 1.2V for 30 min, redox current densities to voltage thereof were measured in a 0.1 M sodium hydroxide aqueous solution saturated with argon. The results are shown in FIGS. 5b to 5d.

As a result of comparing redox current densities of the Pt/TSO catalyst according to the present disclosure and Pt/C catalyst measured before and after stability test as shown in FIG. 5b, while the redox current density of the Pt/TSO catalyst at 0.55V was decreased by 5.21%, the redox current density of the Pt/C catalyst at 0.55V was decreased by 42.7%.

The disclosure has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for synthesizing titanium suboxide ($Ti_xO_{2x-1}$, wherein x is an integer from 2 to 9), comprising:
   absorbing $Co^{2+}$ ions to nano-scale titanium dioxide under a presence of ethanol as a solvent;
   evaporating ethanol therefrom, to thereby obtain powder; and
   reacting the powder at a temperature ranging from 800° C. to 900° C. in an electric furnace under a reducing atmosphere, to thereby obtain titanium suboxide ($Ti_xO_{2x-1}$, wherein x is an integer from 2 to 9) nanoparticles.

2. The method according to claim 1, wherein the titanium suboxide nanoparticles are synthesized under reducing atmosphere of hydrogen, nitrogen or methane gas.

3. The method according to claim 1, wherein the titanium suboxide nanoparticles are synthesized at a temperature ranging from 800° C. to 900° C. under a reducing atmosphere of hydrogen gas for 2 hr to 4 hr.

4. A method for manufacturing a catalyst electrode of a fuel cell, comprising:
   absorbing $Co^{2+}$ catalytic ions to nano-scale titanium dioxide under the presence of ethanol as a solvent;
   evaporating ethanol therefrom, to thereby obtain powder;
   placing the powder obtained above in an electric furnace and reacting it at a temperature ranging from 800° C. to 900° C. under a reducing atmosphere, to thereby obtain titanium suboxide ($Ti_xO_{2x-1}$, wherein x is an integer from 2 to 9) nanoparticles; and
   impregnating an active metal on the thus obtained titanium suboxide ($Ti_xO_{2x-1}$, wherein x is an integer from 2 to 9) nanoparticles, to thereby obtain a catalyst electrode.

5. The method according to claim 4, wherein the active metal is platinum (Pt) or an alloy of platinum (Pt) and more than one transition metal selected from nickel (Ni), paladium (Pd), rhodium (Rh), titanium (Ti) and zirconium (Zr).

* * * * *